United States Patent [19]

Higgins

[11] 4,250,042

[45] Feb. 10, 1981

[54] CORROSION INHIBITION IN WELL-DRILLING OPERATIONS USING AQUEOUS SYSTEMS CONTAINING AMMONIUM CARBOXYLATES

[75] Inventor: William A. Higgins, Gates Mills, Ohio

[73] Assignee: The Lubrizol Corporation, Wickliffe, Ohio

[21] Appl. No.: 30,577

[22] Filed: Apr. 16, 1979

[51] Int. Cl.$^3$ ................................................ C09K 7/02
[52] U.S. Cl. ............................ 252/8.5 C; 252/8.55 R; 252/392; 422/16; 422/17
[58] Field of Search .......... 252/8.5 C, 8.55 R, 8.55 E, 252/392; 422/16, 17, 13

[56] References Cited

U.S. PATENT DOCUMENTS

| | | | |
|---|---|---|---|
| 2,629,649 | 2/1953 | Wachter et al. ................. | 252/392 X |
| 2,638,449 | 5/1953 | White et al. .................... | 252/392 X |
| 2,726,215 | 12/1955 | Jones .............................. | 252/389 |
| 2,764,242 | 9/1956 | Rohrback et al. ............... | 252/8.5 |
| 3,007,865 | 11/1961 | Priest .............................. | 252/8.55 |
| 3,012,606 | 12/1961 | Brooke ............................ | 252/8.55 X |
| 3,126,950 | 3/1964 | Carlberg et al. ................ | 252/8.55 X |
| 3,696,048 | 10/1972 | Hausler et al. ................. | 252/392 |
| 3,893,825 | 7/1975 | Goeller ........................... | 252/392 X |
| 3,981,780 | 9/1976 | Scherrer et al. ................. | 252/392 X |
| 4,045,357 | 8/1977 | Reed .............................. | 252/8.5 |
| 4,053,426 | 10/1977 | Davis et al. .................... | 252/34 |
| 4,113,498 | 9/1978 | Rones et al. ................... | 252/396 X |
| 4,120,655 | 10/1978 | Crambes et al. ............... | 422/15 |
| 4,120,800 | 10/1978 | Valcho et al. .................. | 252/8.55 |
| 4,135,934 | 1/1979 | Mayne et al. .................. | 252/389 X |

FOREIGN PATENT DOCUMENTS

| | | | |
|---|---|---|---|
| 53-79738 | 7/1978 | Japan ............................. | 252/392 |
| 1521984 | 8/1978 | United Kingdom ............ | 252/548 |
| 1532836 | 11/1978 | United Kingdom ............ | 252/49.3 |

*Primary Examiner*—Herbert B. Guynn
*Attorney, Agent, or Firm*—Daniel N. Hall; William H. Pittman; Raymond F. Keller

[57] ABSTRACT

Certain salts of polycarboxylic acids and amino compounds are useful as corrosion inhibitors in aqueous systems used in well-drilling operations. Typical such corrosion inhibitors are made from acids such as sebacic and azelaic acid and amino compounds such as ammonia, ethanol amine, di- and tri-ethanol amines and N,N-diethyl-ethanol amine.

5 Claims, No Drawings

CORROSION INHIBITION IN WELL-DRILLING OPERATIONS USING AQUEOUS SYSTEMS CONTAINING AMMONIUM CARBOXYLATES

BACKGROUND OF THE INVENTION

1. Field of the Invention

This invention relates to corrosion inhibition in well-drilling operations. More particularly it relates to methods of corrosion inhibition using amine salts of certain polycarboxylic acids and certain monoamines in aqueous well-packer solutions and aqueous drilling fluids.

2. Prior Art

It is known to treat aqueous systems, such as drilling muds with corrosion inhibitors to prevent unwanted corrosion of metal equipment during well-drilling operations. Surfactant systems such as succinamates have also been disclosed to be useful in recovering oil from subterranean reservoirs. See, for example, U.S. Pat. No. 4,120,800 to Valcho et al.

The use of ammonium carboxylates as corrosion inhibitors in several contexts has been described in several patents. For example: U.S. Pat. No. 4,113,498 discloses corrosion inhibitors comprising a reaction product of an aliphatic carboxylic acid, a polyhydroxy carboxylic acid and an alkanol amine.

U.S. Pat. No. 4,053,426 and British Pat. Specification No. 1,532,836 describe water-based, metal working fluids containing amine salts of a partial ester of an alkenyl or alkyl succinic acid.

Japanese Patent Application 156,684, as abstracted in Derwent publications abstract number 59567A/33*j5 3079-738, discloses water-soluble corrosion inhibitors for steel containing a carboxylic acid and an amino alcohol.

U.S. Pat. No. 2,726,215 discloses alkali and alkaline earth metal salts of dicarboxylic acids and their use in aqueous systems as corrosion inhibitors.

U.S. Pat. No. 2,638,449 discloses reaction products of fatty acids and dialkanol amines which are further reacted with alkenyl succinic acids having substituents of up to 31 carbon atoms.

U.K. Patent application 1,521,984, as abstracted in Derwent publications, abstract number J5014W-52, describes detergents made by reacting adipic or sebacic acid with mono-, di- or tri-ethanol amine and adjusting the pH of the reaction product to 7–7.5 with amine. The product is described as being soluble in water.

U.S. Pat. No. 4,120,665 describes water-soluble complex salts of certain metals, hydroxycarboxylic acids and phosphoric esters of alkanol amines and their use as corrosion inhibitors.

SUMMARY OF THE INVENTION

A method has now been found of inhibiting metal corrosion in earth drilling operations which comprises contacting at least some of the metal during its use in said operations with at least one water-soluble, ammonium carboxylate salt made from at least one polycarboxylic acid (I) corresponding to the formula:

$$R(COOH)_{2-3} \qquad (I)$$

wherein R is an alkylene or monohydroxy alkylene group of about 4 to about 15 carbons and from at least one amino compound (II) corresponding to the formula:

$$(R')_3N \qquad (II)$$

wherein each R' is independently hydrogen, $C_{1-20}$ hydrocarbyl or a $C_{2-20}$ hydroxyl hydrocarbyl group. Generally these ammonium carboxylates can be represented by the generic formula:

$$R(COO)_n(H)_{n-m}{}^{-m}(R'_3NH)_m{}^{+} \qquad (III)$$

wherein R and R' are as disclosed above, n is an integer of two or three, m is an integer of one to three with the proviso that n is greater than or equal to m. Generally these mono amine salts are made in the absence of other carboxylic acids, specifically in the absence of other monocarboxylic acids.

Often in the inhibition method of this invention at least some of the metal is also contacted with an amount of oxygen such that the partial pressure of oxygen exceeds that found in ambient air at sea level.

The ammonium salts used in this invention are water soluble; this means they have a solubility in water at 25° C. of at least 0.1 gm per liter.

DETAILED DESCRIPTION OF THE INVENTION

The Polycarboxylic Acid (I):

The polycarboxylic acids used to make the inhibitors of the present invention can be represented by the formula:

$$R(COOH)_{2-3} \qquad (I)$$

wherein R is an alkylene, alkenylene or hydroxyl alkylene group of about 4 to about 15 carbons. Typical alkylene groups are the butylene groups such as the 1,2-, 1,3- and 1,4-normal butylene groups, the branched butylene groups and higher homologs thereof up to groups containing about 15 carbons. Often R is an unbranched polymethylene group such as a 1,5-pentylene group, 1,6-hexylene group, 1,7-heptylene group, etc.

Usually, the acid is a dicarboxylic acid although tricarboxylic acids are useful.

The alkenylene groups which can be R are analogous to the alkylene groups except they contain a double bond. The hydroxyl alkylene groups which can be R are similarly analogous to the alkylene groups except a single hydroxyl group is also present in them.

Typically R is an unbranched polymethylene group; often it is an alkylene group of 4 to 10 carbon atoms or a polymethylene group of similar size. Specific examples of the acid (I) are sebacic, azelaic, 1,2,4-dodecanetrioic acid and the like. Mixtures of two or more such acids can also be successfully used.

THE AMINO COMPOUND (II):

The amino compounds useful in making the carboxylate salts used in this invention can be represented by the general formula $$(R')_3N \qquad (II)$$

wherein each R' is independently hydrogen, a $C_{1-20}$ hydrocarbyl or a $C_{2-20}$ hydroxyl hydrocarbyl group. When all the R' groups are hydrogen, the amino compound is ammonia; in other cases it is a primary, secondary or tertiary monoamine. Sometimes at least one R' is a hydroxyl alkyl group. R can also be a di- or tri-(hydroxyl alkyl) group. Specific examples of such hydroxy alkyl amines are ethanol amine, diethanol amine, triethanol amine, propanol amine, di(propanol) amine, tri(propanol) amine, N,N-di(lower alkyl) ethanol or propanol amine (where the alkyl group has up to seven carbon atoms) and the like. With the propanol amines, both the 1,2- and 1,3-isomers are contemplated.

In the invention's broader scope, the monoamine comprising the amino compound (II) can be aliphatic, alicyclic, aromatic or heterocyclic in nature. These include aliphatic-substituted aromatic, aliphatic-substituted alicyclic, aliphatic-substituted aromatic, aliphatic-substituted heterocyclic, alicyclic-substituted aliphatic, alicyclic-substituted aromatic, alicyclic-substituted heterocyclic, aromatic-substituted aliphatic, aromatic-substituted alicyclic, aromatic-substituted heterocyclic, heterocyclic-substituted aliphatic, heterocyclic-substituted alicyclic, and heterocyclic-substituted aromatic amines which may be saturated or unsaturated. If unsaturated, the amine will be free from acetylenic unsaturation (i.e.,-C≡C-).

Aliphatic monoamines include mono-, di- and tri-aliphatic substituted amines wherein the aliphatic groups can be saturated or unsaturated and straight or branched chain. Thus, they are primary, secondary or tertiary aliphatic amines. Such amines include, for example, mono-, di- and tri-alkyl-substituted amines, mono-, di- and tri-alkenyl-substituted amines, and amines having one or two N-alkenyl substituents, one or two N-alkyl substituents and the like. The total number of carbon atoms in these aliphatic monoamines will normally not exceed about 40 and usually not exceed about 20 carbon atoms. Specific examples of such monoamines include ethyl methyl amine, diethyl amine, n-butyl amine, di-n-butylamine, tri-n-butyl amine, allyl amine, isobutyl amine, cocoamine, stearyl amine, lauryl amine, methyl lauryl amine, oleyl amine, N-methyl N-octyl amine, dodecyl amine, octadecyl amine, and the like. Examples of alicyclic-substituted aliphatic amines, aromatic-substituted aliphatic amines, and heterocyclic-substituted aliphatic amines, include 2-(cyclohexyl)-ethyl amine, benzyl amine, phenyl ethyl amine, 3-(furylpropyl)amine and the like.

Alicyclic monoamines are those monoamines wherein there is an alicyclic substituent attached directly to the amino nitrogen through a carbon atom in the cyclic ring structure. Examples of alicyclic monoamines include cyclohexyl amine, cyclopentyl amine, cyclohexenylamine, cyclopentenylamines, N-ethylcyclohexyl amine, dicyclohexyl amine, and the like. Examples of aliphatic-substituted, aromatic-substituted, and heterocyclic-substituted alicyclic monoamines include propyl-substituted cyclohexyl amines, phenyl-substituted cyclopentyl amines, and pyranyl-substituted cyclohexyl amine.

Suitable aromatic amines include those monoamines wherein a carbon atom of the aromatic ring structure is attached directly to the amino nitrogen. The aromatic ring will usually be a mononuclear aromatic ring (i.e., one derived from benzene) but can include fused aromatic rings, especially those derived from naphthylene. Examples of aromatic monoamines include aniline, di(-para-methylphenyl) amine, naphthyl amine, N-(n-butyl) aniline, and the like. Examples of aliphatic-substituted, alicyclic-substituted, and heterocyclic-substituted aromatic monoamines are para-ethyl aniline, para-dodecyl aniline, cyclohexyl-substituted naphthyl amine, and thienyl-substituted aniline.

Heterocyclic mono-amines can also be used in making the carboxylate salts of this invention. As used herein, the terminology "heterocyclic mono-amine(s)" is intended to describe those heterocyclic amines containing at least one primary or secondary amino group and at least one nitrogen as a heteroatom in a heterocyclic ring. Heterocyclic amines can be saturated or unsaturated and can be substituted with alkyl, alkenyl, aryl, alkaryl or aralkyl substituents. Generally, the total number of carbon atoms in the substituents will not exceed about 20. Heterocyclic amines can contain heteroatoms other than nitrogen, especially oxygen and sulfur. Obviously they can contain more than one nitrogen heteroatom. The five- and six-membered heterocyclic rings are preferred.

Among the suitable heterocyclics are aziridines, azetidines, azolidines, pyrrolidine, pyridine, tetra- and di-hydro pyridines, pyrroles, indoles, quinoline, picolines, piperidine and the like. Mixtures of two or more of these heterocyclic amines can be used. Typical heterocyclic amines are the saturated 5-and 6-membered heterocyclic amines.

As will be appreciated by those of skill in the art, when the amino compound (II) is an alicyclic or heterocyclic amine, two (or more) of the R' groups can be joined together. As noted above hydroxyl substituted analogs of all the above-described monoamines can be also used in the invention. Similarly mixtures of such analogs and mixtures of one or more analogs with one or more of the above-described amino compounds can be used. Specifically, mixtures of ammonia with one or more of the above-described monoamines can be used.

THE REACTION OF THE POLYCARBOXYLIC ACID (I) AND THE AMINO COMPOUND (II)

The inhibitor salts used in the method of this invention are formed by neutralizing the acid (I) with the amino compound (II). This neutralization can be carried out in a separate step before formulation of the aqueous system or it can be in situ during formulation of the system by adding the acid(s) and the amine(s) to the system. Usually the free acid is used. The reaction generally takes place in water but its presence is not essential; other solvent/diluents can be used such as lower alkanols, ethers and the like.

Usually about one mole of amino compound (II) is reacted with about one equivalent of acid (I) (an equivalent of acid is its molecular weight divided by the number of carboxylic groups in its structure). In determining acid equivalent weight, an anhydride group, if present, is counted as two carboxylic acid groups. As little as about 0.5 mole acid, as much as about 2.0 mole of amino compound (II) per equivalent of acid (I) can be used.

The aqueous systems used in the method of the present invention contain a corrosion inhibiting amount of at least one of the above-described carboxylate salts. Mixtures of two or more salts can, of course, be used. Generally a corrosion inhibiting amount is at least about 0.01 weight percent of the system and as much as up to the saturation point of the inhibitor salt(s) in the aqueous system. Typically, an inhibiting amount is about 0.5 to about 5% by weight of the aqueous system.

The aqueous systems used in the present invention may also contain other additives when this appears desirable. In some cases it is advisable to add surfactants. The amount of surfactant used depends to some extent on its effectiveness but it may be up to 50% of the aforedescribed inhibitor salts. Other materials commonly used in drilling muds such as bentonite clays and the like may also be present. In some cases thickening water-soluble polymers such as polyacrylates may be included.

In certain cases it may also be desirable to add appropriate bacteriocide or fungicides to protect the aqueous systems from attack from bacteria or fungi. Various agents are known for these purposes, for example phenol derivative compounds which yield formaldehyde, triazines and quaternary ammonium compounds. Other desirable additives for the systems of this invention are known to those of skill in the art.

The following examples more fully describe the inhibitor salts of the present invention and show how they are used. These examples are intended to be merely illustrative and should not be construed as being limiting in any way. All parts and percentages are by weight, unless otherwise specified, and all temperatures are in degrees centrigrade.

EXAMPLE 1

A mixture of 20.2 parts sebacic acid, 12.2 parts water and 14 parts ethanol amine is heated with intermitent agitation for 30 minutes at 80°. A clear yellow liquid containing 70 percent of the desired salt is obtained.

EXAMPLE 2

A mixture of 29 parts suberic acid, 20.4 parts ethanol amine and 21.3 parts water is heated at 80° C. for one hour with intermittent agitation. A clear yellow liquid containing 70% of the desired salt is obtained.

EXAMPLE 3

A mixture of 18.8 parts azelaic acid, 13.2 parts water and 12.2 parts ethanol amine is treated in the same fashion as Example 1 to yield a 70% solution of the desired salt.

EXAMPLE 4

A mixture of 27 parts pimelic acid, 20.4 parts ethanol amine and 20.3 parts water is treated in the same manner as Example 2 to yield a 70% solution of the desired salt.

EXAMPLE 5

A mixture of 149 parts water and 79 parts di(ethanol)amine is heated to 60°-70°. Then 70.5 parts azelaic acid is slowly added. The resulting mixture is heated for 0.5 hour to produce a 50% solution of the desired salt. When tested in the filter paper rust test at 1 percent in water only 1 rust spot was observed.

EXAMPLE 6

To a mixture of 51.25 parts benzyl tri(methyl) ammonium hydroxide (40% in methanol) and 27 parts water is added 12.5 parts azelaic acid over a 0.5 hour period. The resulting mixture is a methanol/water solution containing approximately 40% of the desired salt.

EXAMPLE 7

A mixture of 105.2 parts di(octadecenyl)amine (sold by the Armac Company as Armeen 2S) and 125 parts diluent oil. To this mixture is added 19.8 parts of azelaic acid. The resulting mixture is then heated at 65°-75° for 8.5 hours. The product is a 50% oil solution of the desired salt.

EXAMPLE 8

A mixture of 40 parts isopropanol amine, 80 parts water and 40 parts sebacic acid is stirred until solids disappear. The resulting aqueous salt solution has a pH of 9.0-9.5.

EXAMPLE 9

A mixture of 40 parts isopropanol amine, 80 parts water and 40 parts 1,2-dodecanedioic acid is stirred until homogeneous to provide a solution of the desired salt.

EXAMPLE 10

To a stirred mixture of 376 parts azelaic acid (4 equivalents) and 208 parts water is slowly added 255 parts of reagent grade ammonium hydroxide (4 equivalent). The addition causes the mixture's temperature to rise to 60°. The stirred mixture is held at this temperature for one hour to yield a 53% solution of the desired salt in water.

Effectivness of the inhibitor salt made in Example 10 can be demonstrated in an autoclave corrosion test. Test specimens are prepared from 3½ in drill pipe made of J55 steel. Each rod consists of exposing three specimens in 100 ml beakers immersed in tap water and a 1% concentration of the inhibitor salt. Each specimen is immersed to 80% in the water, the autoclave is pressured to 2350 PSI air or oxygen at 185° F. for 20 hours. The specimen surfaces are sandblasted prior to use. Sample weights before and after the test given weight loss data, from this data the corrosion rate and average corrosion rate are calculated. Results in the presence of air and 100% oxygen are shown in the accompanied table. From this date it can be seen that the inhibitor salt substantially prevents corrosion of drill pipe in the presence of air and oxygen.

| Inhibitor | Atmosphere | Specimen Weight, gm Initial | Specimen Weight, gm Final | Specimen Weight Loss gm | Specimen Weight Loss % | Corrosion Rate, MPY | Avg. Corrosion Rate, MPY |
|---|---|---|---|---|---|---|---|
| None | air | 72.4040 | 72.0952 | 0.3088 | 0.43 | 165.2 | 168 |
| | | 70.1661 | 69.8687 | 0.2974 | 0.42 | 159.1 | |
| | | 70.9802 | 70.6470 | 0.3332 | 0.47 | 178.2 | |
| 1% Example 10 | air | 73.7469 | 73.7469 | 0.0 | 0.0 | 0.0 | 0.033 |
| | | 74.0584 | 74.0582 | 0.002 | 0.0003 | 0.1 | |
| | | 73.6325 | 73.6329 | (+0.0004) | (+0.0003) | 0.0 | |
| None | 100% oxygen | 62.4524 | 62.4372 | 0.0052 | 0.008 | 2.78 | 2.74 |
| | | 60.8099 | 60.8072 | 0.0027 | 0.004 | 1.44 | |
| | | 68.0044 | 67.9969 | 0.0075 | 0.01 | 4.01 | |
| 1% Example 10 | 100% oxygen | 72.6636 | 72.7737 | (+0.0001) | (+0.0001) | 0.0 | 0.0 |
| | | 73.0190 | 73.0191 | (+0.0001) | (+0.0001) | 0.0 | |
| | | 72.0319 | 72.0322 | (+0.0003) | (+0.0004) | 0.0 | |

I claim:

1. A method of inhibiting metal corrosion in earth drilling operations employing aqueous drilling fluids which comprises including in the drilling fluids employed in such operations at least one water-soluble ammonium carboxylate salt made from at least one polycarboxylic acid (I) corresponding to the formula $$R(COOH)_{2-3} \quad (I)$$

wherein R is an alkylene, alkenylene or hydroxyl alkylene group of about 4 to about 15 carbons, with (II) ammonia 2. A method as described in claim 1 wherein the drilling fluid is used in the presence of oxygen gas such that the partial pressure of said oxygen is above that found in ambient air at sea level.

3. A method as described in claim 1 wherein the group R of the acid (I) is an unbranched, polymethylene group.

4. A method as described in claim 3 wherein the acid (I) is selected from the group consisting of sebacic, azelaic, dodecanedioic acids and mixtures thereof.

5. A method as described in claim 4 wherein the drilling fluid is used in the presence of oxygen gas such that the partial pressure of said oxygen is above that found in ambient air at sea level.